United States Patent
Carver et al.

(10) Patent No.: US 10,051,010 B2
(45) Date of Patent: *Aug. 14, 2018

(54) METHOD AND SYSTEM FOR AUTOMATED INCIDENT RESPONSE

(71) Applicant: Accenture Global Services Limited, Dublin (IE)

(72) Inventors: Matthew Carver, Fairfax, VA (US); Louis William DiValentin, Fairfax, VA (US); Michael L. Lefebvre, Arlington, VA (US); Elvis Hovor, Clarksburg, MD (US); David William Rozmiarek, Falls Church, VA (US)

(73) Assignee: Accenture Global Services Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 15/793,853

(22) Filed: Oct. 25, 2017

(65) Prior Publication Data

US 2018/0097847 A1    Apr. 5, 2018

Related U.S. Application Data

(63) Continuation of application No. 15/196,651, filed on Jun. 29, 2016, now Pat. No. 9,807,120, which is a
(Continued)

(51) Int. Cl.
*G06F 21/00* (2013.01)
*H04L 29/06* (2006.01)
(Continued)

(52) U.S. Cl.
CPC ............ *H04L 63/20* (2013.01); *G06F 3/0482* (2013.01); *H04L 41/0816* (2013.01);
(Continued)

(58) Field of Classification Search
CPC ............ H04L 63/1416; H04L 63/1433; H04L 63/1441; H04L 63/1408; H04L 63/20
See application file for complete search history.

(56) References Cited

U.S. PATENT DOCUMENTS 2,208,210 A    7/1940  Coppola
7,450,005 B2  11/2008  Anand et al.
(Continued)

FOREIGN PATENT DOCUMENTS

WO    WO 2007/0090224    8/2007

OTHER PUBLICATIONS

U.S. Non-Final Office Action for U.S. Appl. No. 14/473,866 dated Aug. 12, 2015, 10 pages.
(Continued)

*Primary Examiner* — Ghazal B Shehni
(74) *Attorney, Agent, or Firm* — Fish & Richardson P.C.

(57) ABSTRACT

Methods, systems, and apparatus, including computer programs encoded on computer storage media, for implementing a response to one or more security incidents in a computing network. One of the methods includes identifying a security incident based on detecting one or more indicators of compromise associated with the security incident, comparing the security incident with a predefined ontology that maps the security incident to one or more courses of action, selecting a response strategy that includes one or more of the courses of action, and implementing the response strategy as an automated response.

20 Claims, 6 Drawing Sheets

Related U.S. Application Data continuation of application No. 14/473,866, filed on Aug. 29, 2014, now Pat. No. 9,386,041.

(60) Provisional application No. 62/010,816, filed on Jun. 11, 2014.

(51) Int. Cl.
  *H04L 12/24* (2006.01)
  *G06F 3/0482* (2013.01)

(52) U.S. Cl.
  CPC .......... *H04L 41/12* (2013.01); *H04L 63/1416* (2013.01); *H04L 63/1441* (2013.01)

(56) References Cited

U.S. PATENT DOCUMENTS

| | | | |
|---|---|---|---|
| 8,209,759 | B2 | 6/2012 | Newton et al. |
| 9,386,041 | B2 | 7/2016 | Carver et al. |
| 9,807,120 | B2 | 10/2017 | Carver et al. |
| 2006/0212925 | A1 | 9/2006 | Shull et al. |
| 2006/0212930 | A1 | 9/2006 | Shull et al. |
| 2007/0150957 | A1 | 6/2007 | Hartrell et al. |
| 2008/0244748 | A1 | 10/2008 | Neystadt et al. |
| 2010/0024037 | A1 | 1/2010 | Grzymala-Busse et al. |
| 2010/0235879 | A1 | 9/2010 | Burnside et al. |
| 2011/0040983 | A1 | 2/2011 | Grzymala-Busse et al. |
| 2011/0093916 | A1 | 4/2011 | Lang et al. |
| 2011/0314557 | A1 | 12/2011 | Marshall et al. |
| 2013/0191919 | A1 | 7/2013 | Basavapatna et al. |
| 2014/0020072 | A1 | 1/2014 | Thomas et al. |
| 2014/0214610 | A1 | 7/2014 | Moshir et al. |
| 2015/0365438 | A1 | 12/2015 | Carver et al. |
| 2016/0308910 | A1 | 10/2016 | Carver et al. |

OTHER PUBLICATIONS

U.S. Notice of Allowance for U.S. Appl. No. 14/473,866 dated Apr. 4, 2016, 8 pages.
Extended European Search Report in Application No. 15171735.2, dated Nov. 11, 2015, 8 pages.
Penta et al., "The life and death of statically detected vulnerabilities: An empirical study," Information Software Technol., 51(10):1469-1484 (Oct. 1, 2009).
Australia Office Action in Appl. No. 2015203088, dated Mar. 7, 2016, 2 pages.
U.S. Non-Final Office Action for U.S. Appl. No. 14/473,910, dated Dec. 7, 2016, 14 pages.
U.S. Non-Final Office Action for U.S. Appl. No. 15/196,651, dated Nov. 10, 2016, 14 pages.
U.S. Notice of Allowance for U.S. Appl. No. 15/196,651, dated Jun. 28, 2017, 9 pages.
U.S. Notice of Allowance for U.S. Appl. No. 14/473,910, dated Jun. 15, 2017, 12 pages.

METHOD AND SYSTEM FOR AUTOMATED INCIDENT RESPONSE

CROSS-REFERENCE TO RELATED APPLICATIONS

This application is a continuation (and claims the benefit of priority under 35 USC 120) of U.S. application Ser. No. 15/196,651, filed Jun. 29, 2016, titled "METHOD AND SYSTEM FOR AUTOMATED INCIDENT RESPONSE," which is a continuation (and claims the benefit of priority under 35 USC 120) of U.S. application Ser. No. 14/473,866, filed Aug. 29, 2014, titled "METHOD AND SYSTEM FOR AUTOMATED INCIDENT RESPONSE," now U.S. Pat. No. 9,386,041, which claims the benefit of U.S. Provisional Application Ser. No. 62/010,816, filed Jun. 11, 2014, titled "DECEPTION NETWORKS AND INDICATOR ANALYTICS." All of these prior applications are incorporated by reference in their entirety.

BACKGROUND

The present disclosure relates to security and network operations.

SUMMARY

In general, one innovative aspect of the subject matter described in this specification can be embodied in methods for implementing a response to one or more security incidents in a computing network, including identifying a security incident based on detecting one or more indicators of compromise associated with the security incident, comparing the security incident with a predefined ontology that maps the security incident to one or more courses of action, selecting a response strategy that includes one or more of the courses of action, and implementing the response strategy as an automated response.

Other embodiments of this aspect include corresponding systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments may each optionally include one or more of the following features. For instance, the predefined ontology can be a runbook ontology that includes a representation of a structure that specifies details for controlling the computing network. One or more indicators of compromise can indicate a security threat to the computing network. The indicators of compromise may be previously prioritized based at least in part on potential effectiveness in preventing or mitigating the security threat. The indicators of compromise can include one or more of a process name, a process identifier, a process hash, a file, an object, an application, a service, an Internet Protocol address, a registry key, or a user account. The one or more courses of action can include workflow steps to be performed in response to the incident, and implementing the response strategy may include performing the workflow steps. The one or more courses of action can include infrastructure changes to be implemented in the computing network in response to the incident, and implementing the response strategy may include implementing the infrastructure changes. Implementing the response strategy as an automated response can include coordinating operations of one or more third party services. Implementing the response strategy as an automated response can include gathering data by a host agent and providing the data to a forensics repository. A notification may be communicated about the selected response strategy that includes a message that the response strategy has been implemented. The notification about the selected response strategy can include a description of the security incident and a decision prompt. An indication can be received that the response strategy is to be performed, and the response strategy may be implemented in response to receiving the indication. The notification about the selected response strategy can include a list of possible courses of action to be performed, and receiving the indication may include receiving a selection of one of the courses of action.

Particular embodiments of the subject matter described in this specification may be implemented so as to realize one or more of the following advantages. Computer networks can defend against evolving cyber-attacks. Indicators of compromise can be operationalized to prevent the spread of a threat internally. Threat actors can be profiled and possible motivations against an organization can be determined. Responses to threats can be automated, and systems and processes for providing mitigations can be coordinated. Organizations can share information related to potential threats.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes systems, methods, and computer programs for analyzing threat indicators, implementing deception networks, and automating incident responses in a computer network security environment. In general, analyzing threat indicators may include aggregating threat activity identified within a computer network and applying analytics to gain actionable insights into security threats. Predictive analytics may be used to determine threat indicators which can be used to improve an organization's security posture. In general, deception networks can combine network agility, deep packet inspection, and honeypots to identify indicators of network compromise, to contextualize internal threat intelligence, and to automatically apply mitigations using infrastructure orchestration. In general, incident responses may include incident discovery and incident remediation processes.

Active defense techniques for network security may include orchestrating incident response and threat management systems, incorporating deception network capabilities, and leveraging software-defined networking (SDN). Predetermined courses of action may be established, based on the processes within a security organization. Process changes may be implemented automatically or semi-automatically through orchestration. To investigate threat activity, and/or to engage an adversary, deception networks, decoy resources, anti-reconnaissance, and resource shifting may be used. For example, an adversary can be deceived by generating false network topologies and baiting the adversary into a honeypot (e.g., a computer, data, and/or network site that appear as part of a network and that appear to include information of value, but is sandboxed and monitored). A sandboxed environment, for example, can provide a contained set of resources that permits actions by a security threat, with minimal or no permanent effect to the environment and/or to an organization's network. Information gathered from observation of the adversary's behavior, for example, may be used to proactively mitigate threats to an organization. Security response and mitigation capabilities can be embedded into an agile and adaptive infrastructure. By leveraging application and network virtualization capabilities, for example, an organization can meet the adversary's tactics.

Figure 1:
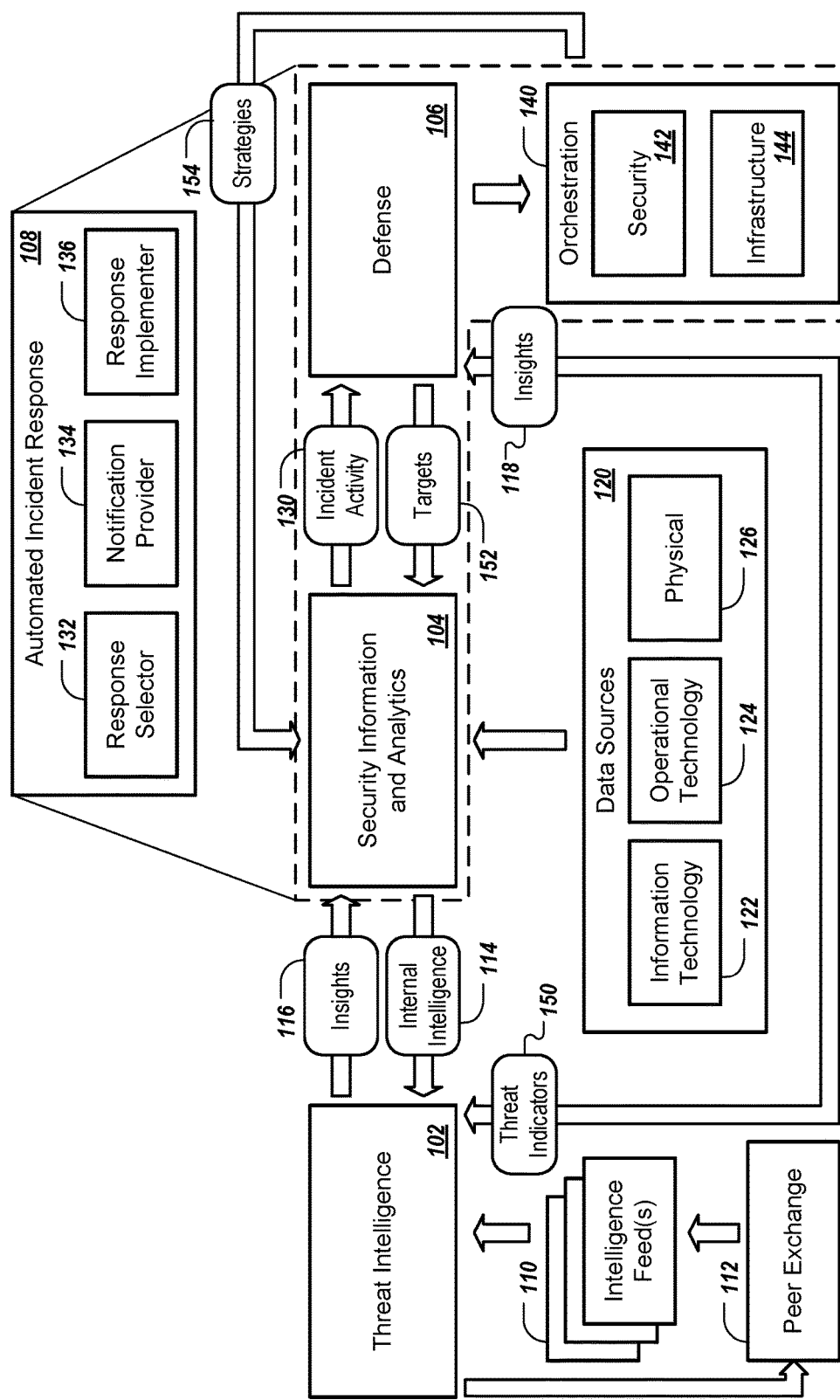
FIGS. 1 & 2 depict example systems that can execute implementations of the present disclosure.

FIG. 1 depicts an example system 100 that can execute implementations of the present disclosure. In the present example, the system 100 includes multiple hardware and/or software components (e.g., modules, objects, services) including a threat intelligence component 102, a security information and analytics component 104, and a defense component 106. Two or more of the components 102, 104, and 106 may be implemented on the same device (e.g., same computing device), or on different devices, such as devices included in a computer network or a peer-to-peer network. Operations performed by each of the components 102, 104, and 106 may be performed by a single computing device, or may be distributed to multiple devices.

The threat intelligence component 102 can receive information from one or more intelligence feeds 110. For example, the intelligence feeds 110 may include feeds from commercial, government, and/or peers sources. A peer source, for example, may be associated with a similar type of organization (e.g., a similar type of business, such as a business in a similar sector or industry) as an organization that hosts, maintains, or operates the system 100. As another example, a peer source may be associated with a system that includes one or more components (e.g., operating systems, databases, applications, services, and/or servers) that are similar to components of the organization's network. A peer source may also be another organization that hosts, maintains, or operates a system similar in structure to system 100 (e.g., one with one or more similar components, such as, for instance, network components of the same or similar make or model, or running a same or similar version of operating software, or operating a same or similar version of application software). In some implementations, a service may receive security threat information from multiple peer sources, and provide aggregated intelligence feeds in return to each of the sources. For example, one or more of the intelligence feeds 110 can be provided by a peer exchange service 112 which receives threat information from multiple peers (e.g., including the system 100), and which aggregates and provides the information in return to each of the peers, thus facilitating the sharing of security threat information among peer organizations.

Each of the intelligence feeds 110, and internal intelligence 114 from the system 100, may include information associated with one or more security threats. Upon receiving feed information, for example, the threat intelligence component 102 can identify key indicators and observables associated with each of the threats. Indicators and observables may include, for example, names, identifiers, and/or hashes of processes, objects, files, applications, or services, Internet Protocol (IP) addresses of devices, registry keys to be accessed or modified, user accounts, or other suitable indicators and observables of a security threat. In some implementations, security threat information from multiple feeds may be consolidated and/or normalized. For example, a consolidated view of multiple feeds may include a list of indicators and observables upon which action may be taken.

Insights 116, 118 based on the security threat information can be provided by the threat intelligence component 102 to the security information and analytics component 104 and/or to the defense component 106. For example, insights 116 can include information associated with key indicators and observables for previously occurring security threats, such as information that indicates that suspicious activity has been observed in association with a particular executable that has been used by particular instances of malware and by particular threat actors. In some implementations, insights 118 provided to the defense component 106 may include information associated with an incident response plan and one or more mitigating controls. For example, based on one or more indicators of compromise identified by the intelligence component 102, an appropriate plan of action may be generated, selected, and implemented to respond to a corresponding security threat.

In general, the security information and analytics component 104 may be supported by security information and event management (SIEM), analytics, and visualization capabilities. The security information and analytics component 104 can monitor one or more internal data sources, and can map threat indicators to predefined courses of action to take in response to various security threats. For example, the security information and analytics component 104 can receive information from internal network data sources 120 (e.g., including information technology data sources 122, operational technology data sources 124, and/or physical data sources 126), and can provide monitoring of patterns and anomalies indicative of threat activity within an organization, as informed by the insights 116 provided by the threat intelligence component 102. Based on the insights 116, for example, the security and information analytics component 104 can modify its threat monitoring process. For example, when the security and information analytics component 104 detects a known pattern of events (e.g., related to the insights 116, such as the existence of a file, an activity on an IP address, or another indicator or observable action), it can record an incident, can trigger one or more requests for responses and can provide the response requests to the defense component 106. Response requests may include incident activity information 130, for example, which may include information related to appropriate handling of a security threat or security breach, such as removal of a file, reporting of an IP address, upgrading of software, or another appropriate course of action.

In general, the defense component 106 may be supported by orchestration services 140 (e.g., including security orchestration services 142 and/or infrastructure orchestration services 144), which can set policies and can automate threat management workflows. The security orchestration services 142, for example, can maintain an ontology regarding actions to be performed in response to particular security threats or breaches, whereas the infrastructure orchestration services 144 can maintain information related to mitigations (e.g., infrastructure changes by a software-defined networking controller) to be performed. Based on insights 118 from the threat intelligence component 102 and/or incident activity information 130 from the security information and analytics component 104, for example, the defense component 106 can provide automated or semi-automated infrastructure changes and service management ticketing to mitigate the impact of identified threats or breaches. The defense component 106, for example, can perform particular actions in response to particular indicators, such as blocking an IP address, blocking a process executed by an endpoint, reporting to data loss/leak prevention (DLP) when a particular document is opened, redirecting traffic, or another appropriate action. To mitigate a phishing attack, for example, the defense component 106 can cause a predefined course of action to be executed, including using the orchestration services 140 to determine whether a uniform resource locator (URL) included in an e-mail is malicious, and if so, to block access to the URL and to generate a workflow request to remove the malicious e-mail from a recipient's mailbox. As another example, to mitigate a distributed denial-of-service (DDoS) attack, the defense component 106 can use the orchestration services 140 to modify software-defined networking (SDN) settings to reroute network traffic associated with the attack.

In some implementations, one or more automated incident response components 108 (e.g., discussed in further detail in association with FIG. 4) may be distributed among one or more of the security information and analytics component 104, the defense component 106, and/or the orchestration services 140. In the present example, the automated incident response components 108 include a response selector 132, a notification provider 134, and a response implementer 136. The response selector 132, for example, can select an appropriate strategy for responding to an identified incident (e.g., a security threat or breach), based on comparing the incident to a predefined ontology. The notification provider 134, for example, can optionally provide information associated with the identified incident to an operator to facilitate a semi-automated response. The response implementer 136, for example, can implement the selected response strategy by implementing one or more steps indicated by the predefined ontology. Operations performed by each of the components 132, 134, and 136 may be performed by a single computing device, or may be distributed to multiple devices.

In some implementations, the defense component 106 may use a deception network (e.g., discussed in further detail in association with FIG. 2) to mitigate a security threat and/or to gather additional intelligence related to the threat. Based on information gathered by the deception network, for example, information associated with one or more threat indicators 150 can be provided to the threat intelligence component 102 and/or information associated with one or more targets 152 (e.g., suspicious processes, files, traffic sources, or other aspects to be monitored) may be provided to the security information and analytics component 104. As another example, the security information and analytics component 104 may receive response strategy information 154 from the security orchestration services 142. Insight related to internal threat intelligence 114 (e.g., indicators and observables determined from the data sources 120 and/or deception networks) can be provided to the threat intelligence component 102 for external communication (e.g., via the peer exchange 112).

Figure 2:
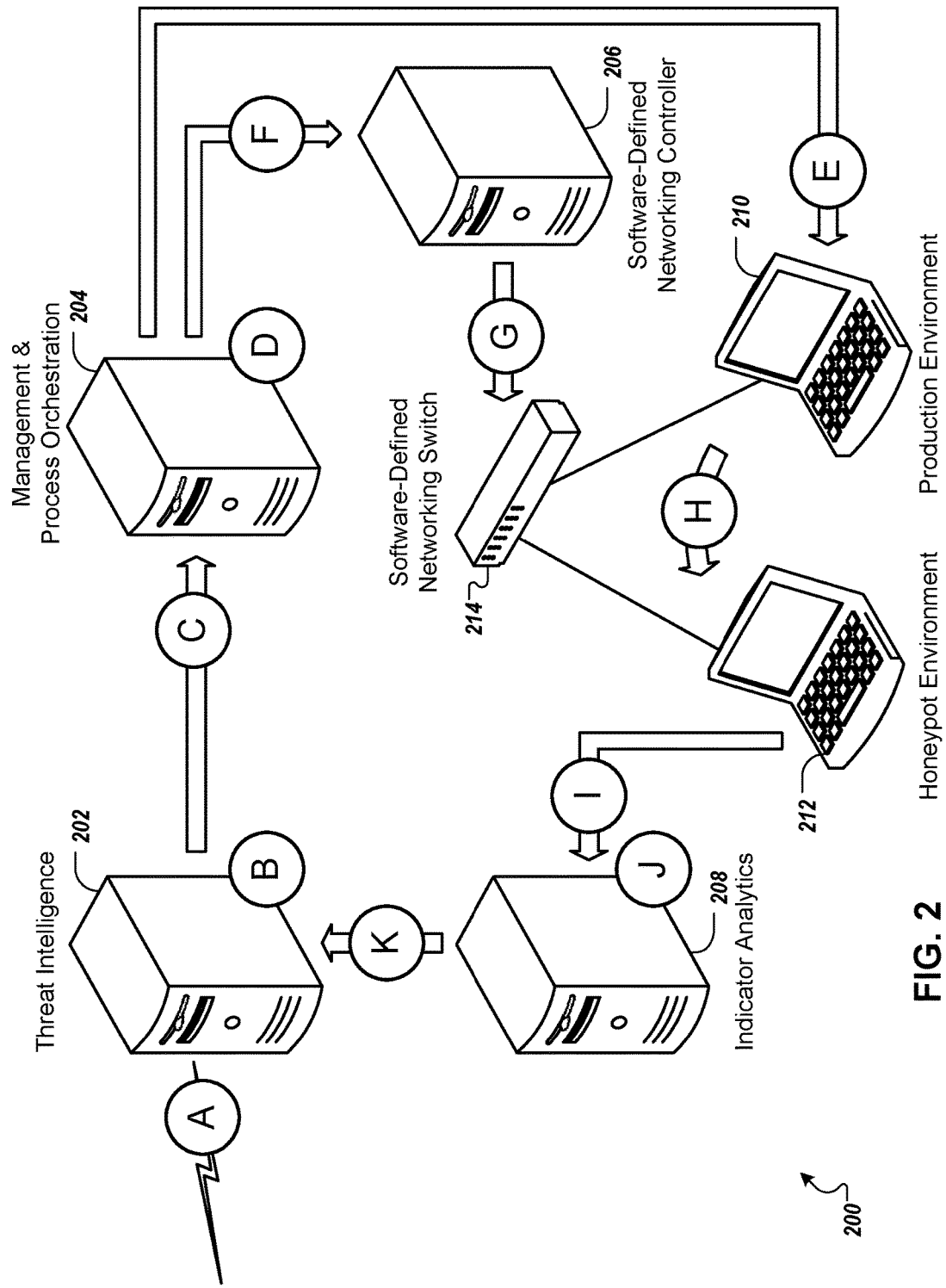

FIG. 2 depicts an example system 200 that can execute implementations of the present disclosure, including the implementation of a deception network. FIG. 2 also illustrates an example flow of data within the system 200 during stages (A) to (K), where the stages (A) to (K) may occur in the illustrated sequence, or they may occur in a sequence that is different than in the illustrated sequence. For example, two or more of the stages (A) to (K) may occur concurrently.

The example system 200 includes multiple computing devices (e.g., personal computing devices, servers, server clusters) in communication over a wired and/or wireless network. In the present example, the system 200 includes a threat intelligence server 202, a management and process orchestration server 204, a software-defined networking controller 206, and an indicator analytics server 208. Each of the devices 202, 204, 206, and 208 can include one or more processors configured to execute instructions stored by computer-readable media for performing various device operations, such as input/output, communication, data processing and/or data maintenance. An example computer device is described below with reference to FIG. 6. The devices 202, 204, 206, and 208, for example, can communicate over a local area network, a wireless network, a wide area network, a mobile telecommunications network, the Internet, or any other suitable network or any suitable combination thereof.

Referring to the example flow of data, during stage (A), threat intelligence information is received by the threat intelligence server 202. For example, a peer organization can share (e.g., via the peer exchange 112, shown in FIG. 1), information associated with an IP block of addresses targeting a particular type of resource (e.g., a database server). As another example, internal threat intelligence information can be provided by monitoring capabilities of a security information and event management system (e.g., included in the security information and analytics component 104, shown in FIG. 1).

During stage (B), threat intelligence information is contextualized and stored. For example, the threat intelligence server 202 can contextualize and store information associated with external and/or internal security threats to provide an understanding of a threat environment. For example, contextualizing and storing information may include matching threat information identified from internal security threats to threat information identified from external security threats to supplement the information from each source. In the present example, one or more threat indicators (e.g., an IP block of addresses) may be associated with a particular security threat (e.g., a secure shell (SSH) brute force attack).

During stage (C), applicable threat intelligence information is provided to the management and process orchestration server 204. For example, the information can be provided as a list of key indicators and observables. As another example, the management and process orchestration server 204 can receive threat intelligence information through an application programming interface (API).

During stage (D), the management and process orchestration server 204 identifies applicable actions for identified security threats, and executes courses of action. For example, the management and process orchestration server 204 can maintain information associated with predefined courses of action (e.g., a playbook) for various types of security threats. When the management and process information orchestration server 204 identifies an occurrence of a security threat (e.g., via one or more data sources 120, shown in FIG. 1) as matching a known threat indicator, it can execute a course of action to mitigate the particular threat. In the present example, the management and process orchestration server 204 can receive information indicating that a production environment 210 (e.g., a network endpoint running a database server) is in communication with a device associated with an IP address that is a known threat indicator, and can automatically execute an appropriate course of action to mitigate the threat. For example, the management and process orchestration server 204 can change the infrastructure of the system 200 automatically, and/or can manipulate security controls to interfere with an attacker.

During stage (E), process mitigation controls are provided to protect one or more endpoints. For example, the management and process orchestration server 204 may determine that the production environment 210 is at risk, and may provide instructions to the production environment to perform one or more actions, such as removing files, terminating processes, blocking communications, or other appropriate actions. In some implementations, a snapshot may be taken for use in threat analysis and/or for use in rebuilding a session. For example, a snapshot of a current session of the production environment 210 can be taken and can be used to recreate the session in a honeypot environment 212.

During stage (F), flow change information is provided to direct network topology changes. For example, the management and process orchestration server 204 can provide instructions for the software-defined networking (SDN) controller 206 to redirect network traffic intended for the production environment 210 (e.g., traffic from an attacker's IP address) to the honeypot environment 212. The software-defined networking controller 206, for example, can facilitate on-the-fly changing of network topology from a centralized point, such that an attacker may be unaware of the change, and may perceive that communication with the production environment 210 persists while traffic is actually being diverted to the honeypot environment 212.

In some implementations, other software-defined networking (SDN) techniques may be used to passively and/or actively engage an adversary. For example, the software-defined networking controller 206 may implement a white noise generator to report all IP addresses as being open, thus potentially confusing an attacker and causing the attacker to question reconnaissance efforts. As another example, the controller 206 may implement an IP black hole, silencing the system. As another example, fake topologies may be generated, to reduce the effectiveness of reconnaissance efforts. As another example, targeted deep packet inspection, data manipulation, network intrusion prevention, and/or breach containment techniques may be implemented.

During stage (G), the software-defined networking (SDN) controller 206 provides flow changes to a software-defined networking (SDN) switch 214. The software-defined networking switch 214, for example, can implement policy changes related to network traffic flow.

During stage (H), the software defined networking switch 214 redirects flow to the honeypot environment 212. The honeypot environment 212, for example, can use process tracing techniques to identify and provide information associated with an attack, as the attack is being performed. In some implementations, events may be generated for actions performed by the system. For example, if an attacker logs in and installs a package, the honeypot environment can identify where the user logs in from, associated process identifiers, commands performed by the system, files manipulated by the installation, registry keys that are modified, and other relevant information.

During stage (I), information is provided by the honeypot environment 212 to the indicator analytics server 208. For example, information related to an attacker's tactics, techniques, and procedures (TTP) can be harvested, and sent to the indicator analytics server 208 for analysis.

During stage (J), the indicator analytics server 208 generates threat intelligence. For example, based on observable threat indicators identified by the honeypot environment 212, the indicator analytics server 208 can identify one or more indicators that are potentially actionable, and that can be used to determine insights for defense against threats to the system 200.

During stage (K), generated threat intelligence is provided to the threat intelligence server 202. The threat intelligence server 202, for example, can determine whether any internally identified indicators are actionable, and can use external threat intelligence information to contextualize the information. For example, internal and external threat intelligence information can be used to map threat actors to malware to processes.

The cycle shown in stages (A) to (K) may continue iteratively, for example, thus improving an organization's security controls in response to ongoing security threats. Updated threat information, for example, can be provided to the management and process orchestration server 204, where it can be used to generate another predetermined course of action and/or to block future attacks. For example, the threat information can be used to direct network topology changes (e.g., further stages E, F, and G), based on the observed honeypot activity.

Figure 3:
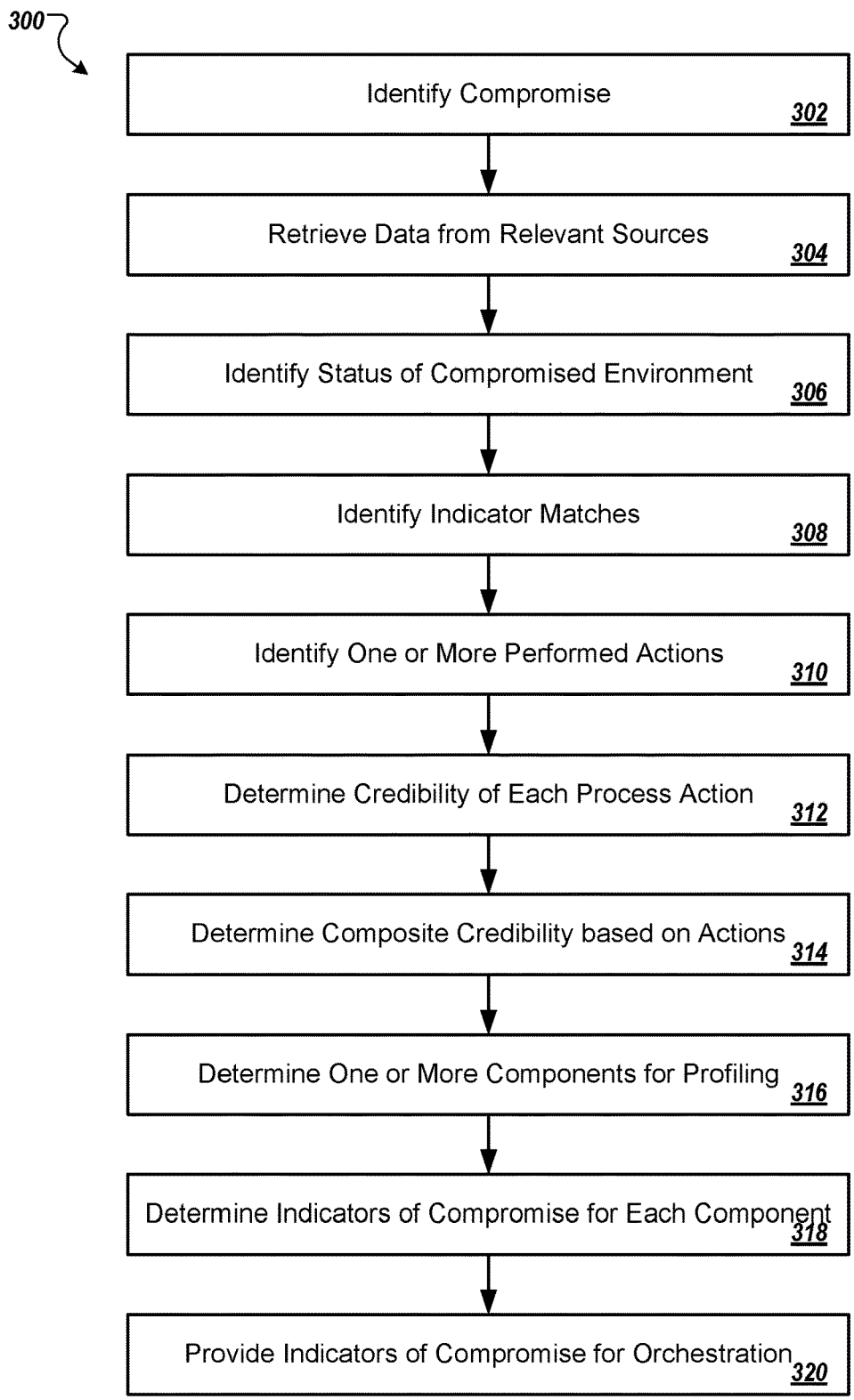
FIGS. 3-5 depict example processes that can be executed in accordance with implementations of the present disclosure.

FIG. 3 is a flowchart of an example process 300 that can be executed in accordance with implementations of the present disclosure. In some implementations, the process 300 may be performed by the system 100 (shown in FIG. 1) and/or 200 (shown in FIG. 2), and will be described as such for the purpose of clarity. The example process 300, for example, may be used for identifying indicators of security threats and/or system compromises. Briefly, the process 300 includes identifying a compromise, retrieving data from relevant sources, identifying the status of a compromised environment, identifying indicator matches, identifying one or more performed actions, determining the credibility of each process action, determining a composite credibility based on the actions, determining one or more components for profiling, determining indicators of compromise for each component, and providing the indicators of compromise for orchestration.

A compromise can be identified (302). For example, the management and process orchestration server 204 can identify a compromise to the system 200 via network traffic analysis. Alternatively, external threat intelligence can provide information that, when validated against other network services, indicates a compromise. The compromise may be, for example, a process compromise (e.g., a malicious running process on a system), an object compromise (e.g., an executable or other file), a suspicious network connection, or another sort of compromise to the system 200.

Data can be retrieved (304) from one or more relevant sources. For example, relevant data can be retrieved by the management and process orchestration server 204 from endpoint management systems, security information and event management (SIEM) systems, packet capture (PCAP) monitoring systems, or other suitable sources. Relevant data can be structured or unstructured, for example. The data can be analyzed by the indicator analytics server 208, for example, to generate one or more indicators of compromise. In some implementations, the data can be persisted (e.g., in a Hadoop cluster) for future reference.

The status of a compromised environment can be identified (306). For example, endpoint management software can be used to take a snapshot of a system (e.g., the honeypot environment 212 and/or the production environment 210) under attack. The snapshot, for example, may provide one or more potential indicators of compromise, based on a list of currently running processes, recently (e.g., within a predetermined timeframe, such as a minute, ten seconds, a second, or another suitable timeframe) ended processes, and/or recently modified objects in a similar timeframe.

Indicator matches can be identified (308). For example, security threat information provided by the threat intelligence server 202 can be accessed by the management and process orchestration server 204 and can be used for identifying matches from the list of running and/or recently ended processes and/or modified objects. Processes and/or modified objects that match, for example, may be identified as threat indicators, and may be initially assigned low credibility scores.

One or more performed actions can be identified (310). Actions, for example, may include process spawning, file access or modification, registry value access or modification, analysis of installed files, or other sorts of actions. To identify the actions, for example, data from an endpoint management system may be filtered, and the actions initiated by each process may be sorted into a dataset. In some implementations, identifying performed actions may be an iterative process with halting conditions to identify the scope of the compromise.

The credibility of each process action can be determined (312). In general, each process can initiate a finite number of actions, and each action may be associated with a particular credibility score in regard to the process. For example, for a particular process, an action of modifying a registry value may have a low credibility value, whereas modifying a file may have a high credibility value.

A composite credibility can be determined (314) for each process, based on the actions. For example, the indicator analytics server 208 can access a model that combines the credibility scores for the process actions to generate a composite credibility score (e.g., ranging from zero to one) for each process. In some implementations, the model may include interaction terms between the actions, to a second or third interaction degree. For example, if a process performs two or more actions in conjunction (e.g., concurrently or in series), the process may receive a score adjustment (e.g., an increase or decrease). In some implementations, the model may include a time decay function between actions to deemphasize unrelated actions. In some implementations, a composite credibility score may be determined by a machine learning algorithm (e.g., a general linear model), a cumulative sum algorithm, or another suitable algorithm.

One or more components for profiling can be determined (316). For example, based on the composite credibility scores, a determination can be made of which processes and/or objects to profile for generating indicators of compromise (or threat indicators). In some implementations, the determination can be based on a threshold value for a composite credibility score. When a particular composite credibility score meets the threshold, for example, the indicator analytics server 208 can automatically determine which indicators to provide to the threat intelligence server 202. As another example, indicator selection may be a semi-automated process.

Indicators of compromise can be determined (318) for each component. Indicators of compromise (or actual security threat indicators) may be prioritized, for example, based at least in part on potential effectiveness in preventing or mitigating an associated threat. For example, a process associated with a security threat may communicate with a particular IP address, and may edit a particular registry key. In the present example, indicators of compromise associated with the threat may be the process name and the IP address, since these attributes may be used to prevent the threat from occurring, whereas the registry key may not. Determining indicators of compromise may be an automated or semi-automated process. In general, some low impact indicators may be generated automatically, while indicators for critical systems may require human oversight.

Indicators of compromise can be provided (320) for orchestration. For example, the indicators of compromise can be provided by the threat intelligence server 202 to the management and process orchestration server 204. Based on the indicators of compromise, for example, the management and process orchestration server 204 may coordinate human response and/or automate response to implement mitigations against future security threats.

Figure 4:
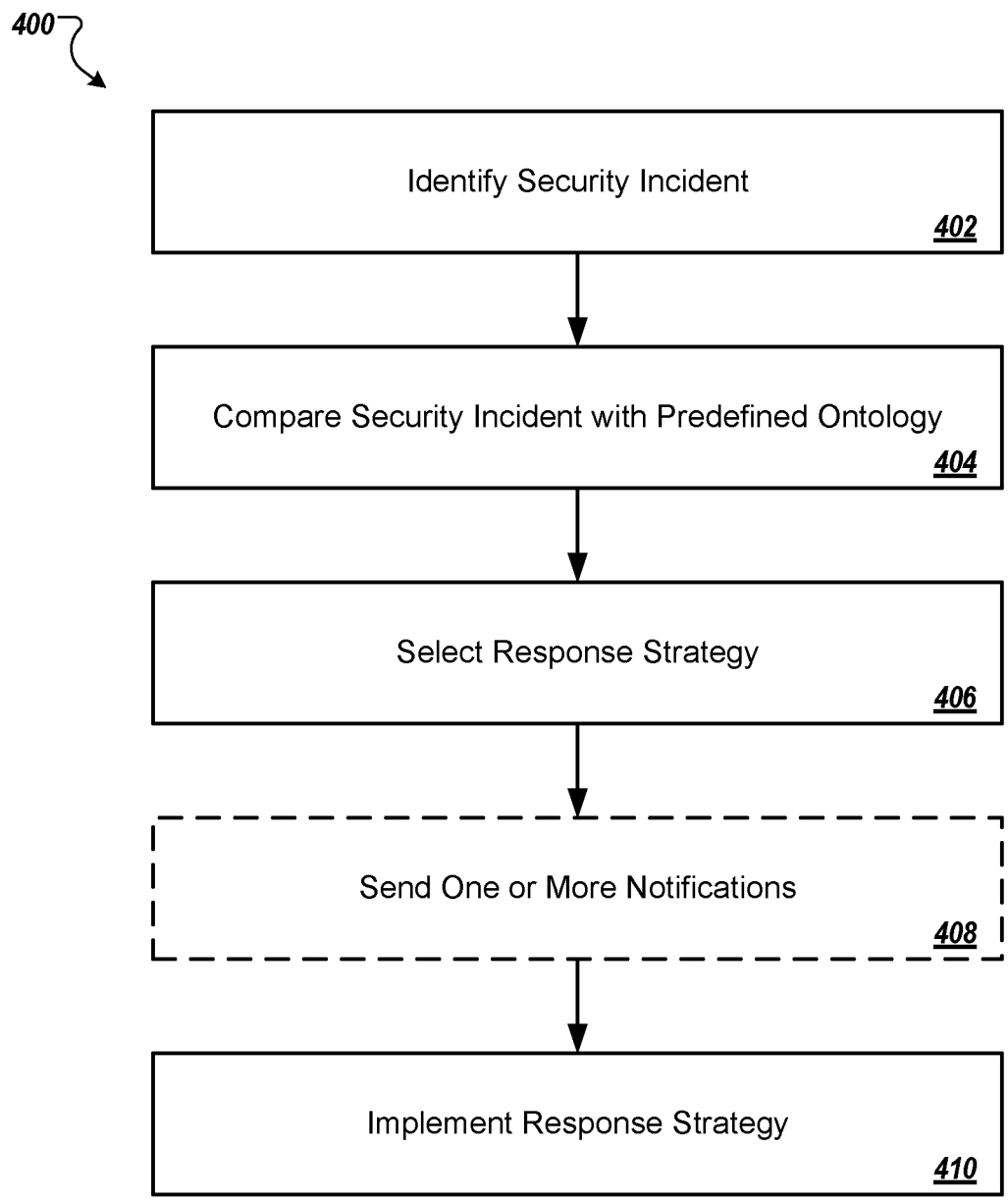

FIG. 4 is a flowchart of an example process 400 that can be executed in accordance with implementations of the present disclosure. In some implementations, the process 400 may be performed by the system 100 (shown in FIG. 1) and/or 200 (shown in FIG. 2), and will be described as such for the purpose of clarity. The example process 400, for example, may be used for providing automated responses to security threats. Briefly, the process 400 includes identifying a security incident (e.g., a security threat or security breach), comparing the security incident with a predefined ontology, selecting a response strategy, optionally sending one or more notifications, and implementing a response strategy. In general, an ontology may include the design and representation of a structure that can be used to control system behavior. For example, a runbook ontology may specify details about configuring, operating, and supporting a computing network (e.g., systems, devices, and/or software applications) and can map security incidents to courses of action.

A security incident can be identified (402). Referring to FIG. 1, for example, the security information and analytics component 104 can identify a security incident (e.g., a security threat or security breach) to an organization's network, based on information from one or more of the data sources 120. For example, a distributed denial-of-service (DDoS) attack on one or more network servers may be identified by an endpoint management system, based on detecting a known pattern of events associated with the type of attack.

The security incident can be compared (404) with a predefined ontology. For example, the security information and analytics component 104 and/or the security orchestration services 142 can maintain an incident response ontology (e.g., a runbook that maps security threats to courses of action), and the system 100 can use one or more of the automated incident response components 108 to compare an identified incident to the ontology. Information related to mitigations (e.g., changes to a software defined networking topology) to be performed in response to a security threat or breach during an incident response process, for example, can be maintained by the infrastructure orchestration services 144.

Based on one or more indicators of compromise associated with a particular security incident (e.g., a DDoS attack), for example, the incident can be identified and an appropriate response strategy (e.g., rerouting network traffic) can be selected (406), e.g., by the response selector 132. Response strategies, for example, may be based on strategy information 154 received from the security orchestration services 142, and/or may be influenced by insight information 116 received from the threat intelligence component 102. For example, if a particular pattern is observed within a security incident, a response strategy may be influenced by the insight information 116 to determine an appropriate course of action (e.g., repairing damage caused by a security breach). Upon selecting the response strategy, for example, the security information and analytics component 104 can provide information (e.g., incident activity information 130) related to the identified security incident (e.g., a security threat or breach) to the defense component 106. In some implementations, the incident activity information 130 may include information for mitigating a security incident, including workflow steps to perform and/or infrastructure changes to implement in response to the incident. In the present example, the incident activity information 130 may include instructions for rerouting some network traffic (e.g., traffic originating from a particular IP block) or all traffic intended for the server under attack to a honeypot or to an IP black hole. As another example, the incident activity information 130 may include information related to incident activity (e.g., a type of threat or breach and affected system components and processes), and response handling may be determined by the defense component 106 and the orchestration services 140.

In some implementations, one or more notifications may optionally be sent (408). For example, the defense component 106 and/or the security information and analytics component 104 can use the notification provider 134 to provide information associated with an identified incident (e.g., a security threat or security breach) and appropriate responses to the incident to an operator to facilitate a semi-automated response that may include automated and human workflow processes (e.g., discussed in further detail in association with FIG. 5). An incident response, for example, may include instructions for mitigating a security threat or security breach while performing a system recovery. A semi-automated process for implementing the incident response, for example, may include various checkpoints for which a human operator may be prompted to make a decision, and further automated processes (e.g., scripts) may be launched in response to receiving an indication of the decision. As another example, upon automatically performing actions for mitigating a security threat or security breach, the defense component 106 can log the actions, and notification of the actions performed can be provided to the operator through a reporting interface.

The response strategy can be implemented (410). For example, the defense component 106 can use the response implementer 136 to implement a selected response strategy via the orchestration services 140 (e.g., including security orchestration services 142 and/or infrastructure orchestration services 144). In general, implementing a response strategy may include implementing steps of an incident response ontology, refining an understanding of a scope of a security incident (e.g., by changing an infrastructure to observe and gather information about a security incident, such as by routing network traffic to perform packet capture), restricting networking and/or communications capabilities of computing devices/systems under threat (e.g., to prevent a spread of an identified threat), eradicating threats, and/or restoring affected devices/systems. In some implementations, the defense component 106 may automate incident responses. For example, the defense component 106 can use the infrastructure orchestration services 144 to coordinate operations of various other services (e.g., third-party services) and to automatically implement a response strategy maintained by the security orchestration services 142. In the present example, a software-defined networking (SDN) controller (e.g., the controller 206, shown in FIG. 2) can be used to redirect network traffic in response to the DDoS attack. As another example, a software-defined networking topology can be modified to limit (e.g., by restricting particular ports) the computing devices and/or systems with which a compromised computing device may communicate. Thus, the compromised computing device may continue to function, but not operate in such a way that it can spread an identified threat.

In some implementations, capture of host-based forensics may be automated. When a system breach is detected or has occurred, for example, priority may be placed on restoring the system, and performing host-based forensics may be deferred. By automating a forensics process, for example, capture of forensics information can be performed in the background and in parallel with restoring the system. In general, an incident response process includes investigating an incident, and includes determining and following a response process, based on the incident. Automating a host-based forensics step in an incident response ontology may include, for example, implementing a step in an incident response ontology, gathering data by a host agent and sending the data to a forensics repository, and proceeding to a next step in the incident response ontology. For example, the security orchestration services 142 can implement a step in an incident response ontology by making a request to the infrastructure orchestration services 144 to perform a particular operation (e.g., a request to gather data from an computing device on a network), and the infrastructure orchestration services 144 can make a corresponding request to a host agent. Upon gathering the data (e.g., by logging the hostname of the device, by taking a snapshot of the device, and by capturing a memory dump and log files), for example, the data can be provided by the host agent to a forensics repository for further analysis/processing. Next, the host agent can send an acknowledgement to the infrastructure orchestration services 144, for example, which can in turn send an acknowledgement to the security orchestration services 142, which can then proceed to the next step in the ontology.

Figure 5:
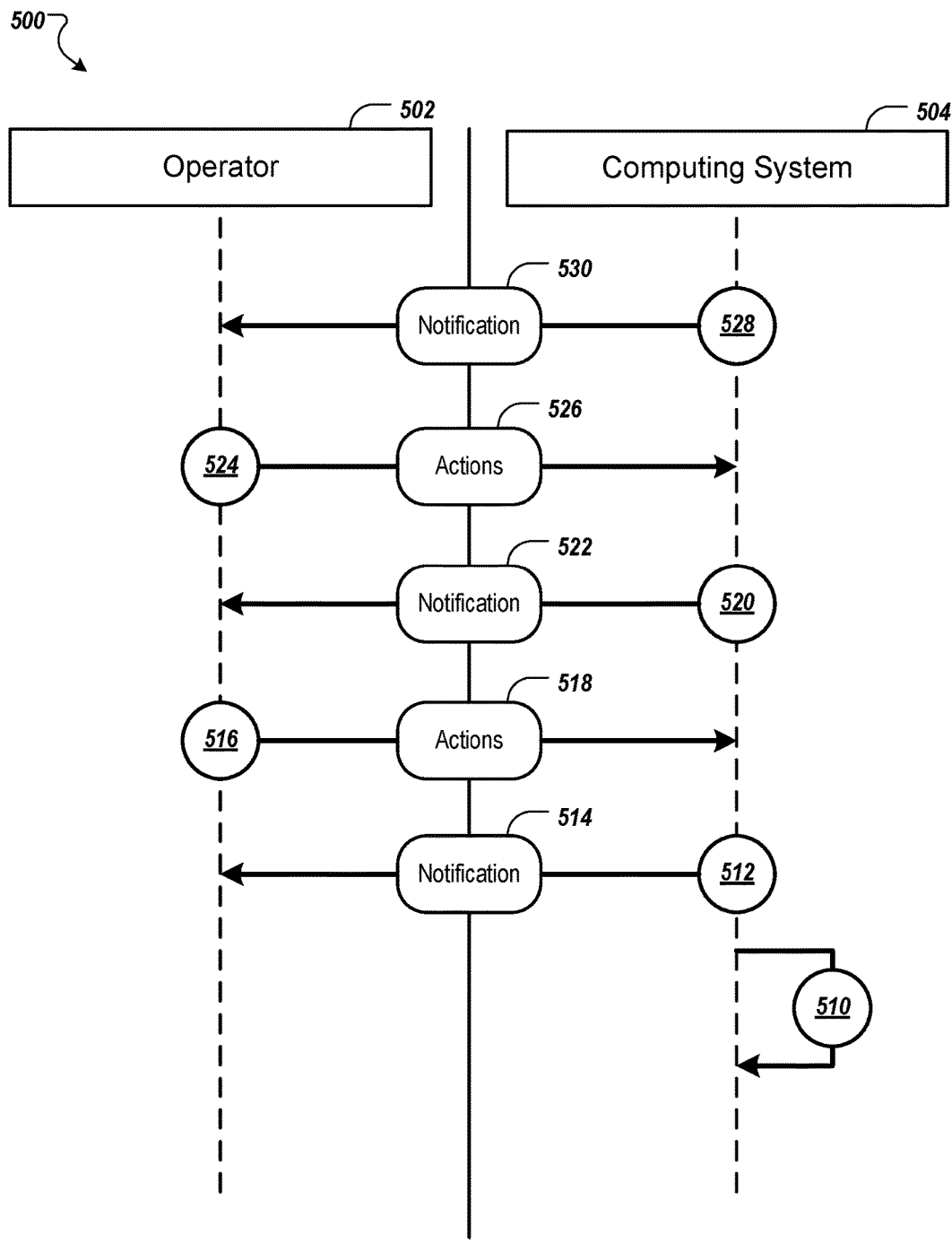

FIG. 5 is a flow diagram of an example process 500 that can be executed in accordance with implementations of the present disclosure. In some implementations, the process 500 may be performed by the system 100 (shown in FIG. 1) and/or 200 (shown in FIG. 2), and will described as such for the purpose of clarity. The process 500, for example, illustrates an example set of interactions between an operator 502 and a computing system 504, in which a semi-automated process for implementing an incident response may occur. For sake of clarity, the example flow of events shown in FIG. 5 generally flows from the bottom of the diagram to the top of the diagram.

During stage 510, for example, a component (e.g., the security information and analytics component 104) of the computing system 504 can continually monitor for indicators of compromise (e.g., indicators of security threats or security breaches), such as suspicious processes, files, traffic sources, or other aspects, based on information provided by the data sources 120. During stage 512, for example, an indicator of compromise associated with a security incident (e.g., a threat or breach) can be detected as having occurred within the computing system 504, and a corresponding notification 514 can be provided (e.g., by the notification provider 134) to the operator 502. In the present example, the indicator of compromise may indicate that a particular computing device of the computing system 504 (e.g., a node on a network) is running a process that has been identified as malicious.

In some implementations, the notification 514 may include one or more possible actions that may be performed (e.g., by the response implementer 136) to mitigate the security incident. Each possible action, for example, can correspond to an incident response (e.g., a script) for mitigating the security incident. In the present example, the notification 514 can include a description of the security incident, and a list of possible actions which may be performed by the response implementer 136, including an action of removing the malicious process from the affected computing device and restoring the device, and an action of blocking outgoing network traffic from the affected device.

During stage 516, for example, the operator 502 can select one or more of the possible actions 518, and information associated with the actions can be provided to the computing system 504. In some implementations, instructions for implementing the incident response (e.g., scripts) can be provided to the computing system 504 by a computing device of the operator 502. In some implementations, instructions for implementing the incident response may be hosted by the computing system 504, and the action(s) 518 may include information that identifies the appropriate instructions. In the present example, the operator 502 provides instructions for removing the malicious process and restoring the affected device.

During stage 520, the computing system 504 can perform the incident response (e.g., execute a script corresponding to the selected action(s) 518), and can provide a further notification 522 that pertains to the security incident, which can include results of the performed actions (e.g., the response scripts), a status of the affected computing device, and a list of possible actions that may be performed based on the device's current status. In the present example, the further notification 522 indicates that a script for removing the malicious process was executed, but additional suspicious files were detected on the affected device. The further notification 522 in the present example may also indicate that an action of isolating the suspicious files, and an action of blocking outgoing network traffic from the affected device may be performed. Based on the notification 522, for example, the operator 502 can select (at stage 524) the option to perform the action of blocking outgoing network traffic from the device, and information associated with the action(s) 526 can be provided to the computing system 504. In the present example, the computing system 504 can perform the corresponding incident response action (at stage 528), and can provide a further notification 530 pertaining to the security incident (e.g., a notification that traffic was successfully blocked). Thus, the semi-automated example process 500 may be iterative, with performed actions potentially triggering further possible actions based on a changing state of an affected device or network. The operator 502, for example, can direct an incident response process at a high level, while the computing system 504 performs low-level repeatable tasks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
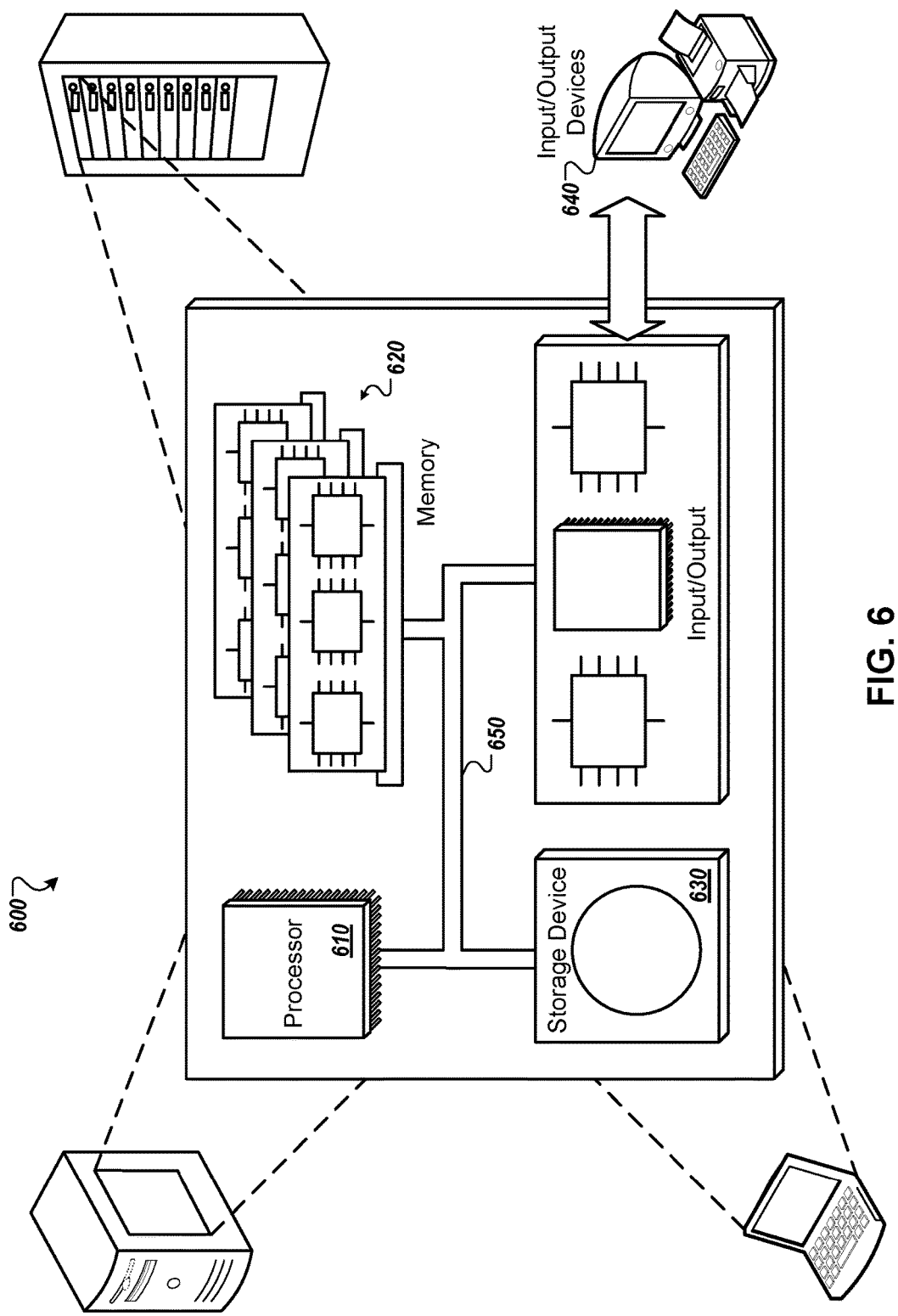
FIG. 6 is a block diagram of a computing system that can be used in connection with computer-implemented methods described in this document.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    receiving, by a threat intelligence device within a computing network and from one or more data sources external to a computing network, security threat information related to one or more computing network security threats;
    based at least in part on the security threat information, identifying one or more indicators of compromise for at least one of the computing network security threats;
    monitoring, by a security information and analytics device of the computing network, one or more computing network data sources internal to the computing network for occurrences of security incidents; and
    determining, by the security information and analytics device, that a security incident is an occurrence of a particular computing network security threat of the one or more computing network security threats, comprising:
        for each indicator of compromise for the particular computing network security threat: (i) determining that one or more actions that are associated with the indicator of compromise have been performed within the computing network; (ii) determining a credibility score of each of the actions that has been performed within the computing network; (iii) determining a composite credibility score of the indicator of compromise, by combining the determined credibility scores of each of the performed actions; and (iv) determining whether the indicator of compromise indicates an actual computing network security threat, based on the composite credibility score; and
        in response to determining that at least one indicator of compromise indicates an actual computing network security threat, based on the composite credibility score:
            providing incident information related to the security incident;
            receiving a selection of at least one course of action for responding to the actual computing network security threat; and
            implementing, by an incident response orchestration device of the computing network, the selected at least one course of action, including coordinating performance of one or more steps of the selected at least one course of action and receiving forensics information related to performance of the one or more steps.

2. The computer-implemented method of claim 1, wherein at least one of the indicators of compromise is based on identifying a currently running or recently ended process on the computing network.

3. The computer-implemented method of claim 1, wherein at least one of the indicators of compromise is based on identifying a presence of a file on the computing network.

4. The computer-implemented method of claim 1, wherein determining that one or more actions that are associated with the indicator of compromise have been performed within the computing network includes identifying actions related to one or more of process spawning, file access or modification, or registry access or modification.

5. The computer-implemented method of claim 1, wherein:

providing the incident information related to the security incident includes providing, through a display interface, a notification of the security incident, the notification including one or more courses of action that are mapped to the particular computing network security threat; and
receiving the selection of at least one course of action for responding to the actual computing network security threat includes receiving, through the display interface, the selection of the at least one course of action.

6. The computer-implemented method of claim 5, wherein the one or more courses of action includes infrastructure changes to be implemented in the computing network in response to the security incident, and wherein implementing the selected at least one course of action includes implementing the infrastructure changes.

7. The computer-implemented method of claim 5, wherein implementing the selected at least one course of action includes coordinating operations of one or more third party services.

8. The computer-implemented method of claim 1, wherein:
    providing the incident information related to the security incident includes providing the incident information to a response selection device;
    receiving the selection of at least one course of action for responding to the actual computing network security threat includes receiving, from the response selection device, a selection of a response strategy that includes the at least one course of action; and
    implementing, by the incident response orchestration device within the computing network, the selected at least one course of action includes providing, to an automated incident response device, instructions for implementing the response strategy as an automated response including, for each step of the at least one course of action, performing the step, receiving forensics information related to performance of the step from a host agent of the automated incident response device, and providing the forensics information to a forensics repository.

9. The computer-implemented method of claim 8, wherein the at least one course of action includes infrastructure changes to be implemented in the computing network in response to the security incident, and wherein implementing the response strategy as an automated response includes implementing the infrastructure changes.

10. The computer-implemented method of claim 8, wherein implementing the response strategy as the automated response includes coordinating operations of one or more third party services.

11. A system comprising:
    one or more computers and one or more storage devices storing instructions that are operable, when executed by the one or more computers, to cause the one or more computers to perform operations comprising:
        receiving, by a threat intelligence device within a computing network and from one or more data sources external to a computing network, security threat information related to one or more computing network security threats;
        based at least in part on the security threat information, identifying one or more indicators of compromise for at least one of the computing network security threats;
        monitoring, by a security information and analytics device of the computing network, one or more computing network data sources internal to the computing network for occurrences of security incidents; and determining, by the security information and analytics device, that a security incident is an occurrence of a particular computing network security threat of the one or more computing network security threats, comprising:

for each indicator of compromise for the particular computing network security threat: (i) determining that one or more actions that are associated with the indicator of compromise have been performed within the computing network; (ii) determining a credibility score of each of the actions that has been performed within the computing network; (iii) determining a composite credibility score of the indicator of compromise, by combining the determined credibility scores of each of the performed actions; and (iv) determining whether the indicator of compromise indicates an actual computing network security threat, based on the composite credibility score; and in response to determining that at least one indicator of compromise indicates an actual computing network security threat, based on the composite credibility score:

providing incident information related to the security incident;

receiving a selection of at least one course of action for responding to the actual computing network security threat; and implementing, by an incident response orchestration device of the computing network, the selected at least one course of action, including coordinating performance of one or more steps of the selected at least one course of action and receiving forensics information related to performance of the one or more steps.

12. The system of claim 11, wherein at least one of the indicators of compromise is based on one or more of identifying a currently running or recently ended process on the computing network, and identifying a presence of a file on the computing network.

13. The system of claim 11, wherein determining that one or more actions that are associated with the indicator of compromise have been performed within the computing network includes identifying actions related to one or more of process spawning, file access or modification, or registry access or modification.

14. The system of claim 11, wherein:

providing the incident information related to the security incident includes providing, through a display interface, a notification of the security incident, the notification including one or more courses of action that are mapped to the particular computing network security threat; and receiving the selection of at least one course of action for responding to the actual computing network security threat includes receiving, through the display interface, the selection of the at least on course of action.

15. The system of claim 11, wherein:

providing the incident information related to the security incident includes providing the incident information to a response selection device;

receiving the selection of at least one course of action for responding to the actual computing network security threat includes receiving, from the response selection device, a selection of a response strategy that includes the at least one course of action; and implementing, by the incident response orchestration device within the computing network, the selected at least one course of action includes providing, to an automated incident response device, instructions for implementing the response strategy as an automated response including, for each step of the at least one course of action, performing the step, receiving forensics information related to performance of the step from a host agent of the automated incident response device, and providing the forensics information to a forensics repository.

16. A computer-readable device encoded with a computer program comprising instructions that, when executed, operate to cause a computer to perform operations comprising:

receiving, by a threat intelligence device within a computing network and from one or more data sources external to a computing network, security threat information related to one or more computing network security threats;

based at least in part on the security threat information, identifying one or more indicators of compromise for at least one of the computing network security threats;

monitoring, by a security information and analytics device of the computing network, one or more computing network data sources internal to the computing network for occurrences of security incidents; and determining, by the security information and analytics device, that a security incident is an occurrence of a particular computing network security threat of the one or more computing network security threats, comprising:

for each indicator of compromise for the particular computing network security threat: (i) determining that one or more actions that are associated with the indicator of compromise have been performed within the computing network; (ii) determining a credibility score of each of the actions that has been performed within the computing network; (iii) determining a composite credibility score of the indicator of compromise, by combining the determined credibility scores of each of the performed actions; and (iv) determining whether the indicator of compromise indicates an actual computing network security threat, based on the composite credibility score; and in response to determining that at least one indicator of compromise indicates an actual computing network security threat, based on the composite credibility score:

providing incident information related to the security incident;

receiving a selection of at least one course of action for responding to the actual computing network security threat; and implementing, by an incident response orchestration device of the computing network, the selected at least one course of action, including coordinating performance of one or more steps of the selected at least one course of action and receiving forensics information related to performance of the one or more steps.

17. The computer-readable device of claim 16, wherein at least one of the indicators of compromise is based on one or more of identifying a currently running or recently ended process on the computing network, and identifying a presence of a file on the computing network.

18. The computer-readable device of claim 16, wherein determining that one or more actions that are associated with the indicator of compromise have been performed within the computing network includes identifying actions related to one or more of process spawning, file access or modification, or registry access or modification.

19. The computer-readable device of claim 16, wherein:
providing the incident information related to the security incident includes providing, through a display interface, a notification of the security incident, the notification including one or more courses of action that are mapped to the particular computing network security threat; and
receiving the selection of at least one course of action for responding to the actual computing network security threat includes receiving, through the display interface, the selection of the at least one course of action.

20. The computer-readable device of claim 16, wherein:
providing the incident information related to the security incident includes providing the incident information to a response selection device;

receiving the selection of at least one course of action for responding to the actual computing network security threat includes receiving, from the response selection device, a selection of a response strategy that includes the at least one course of action; and implementing, by the incident response orchestration device within the computing network, the selected at least one course of action includes providing, to an automated incident response device, instructions for implementing the response strategy as an automated response including, for each step of the at least one course of action, performing the step, receiving forensics information related to performance of the step from a host agent of the automated incident response device, and providing the forensics information to a forensics repository.

* * * * *